United States Patent [19]

Lindert et al.

[11] Patent Number: 4,970,264

[45] Date of Patent: Nov. 13, 1990

[54] TREATMENT AND AFTER-TREATMENT OF METAL WITH AMINE OXIDE-CONTAINING POLYPHENOL COMPOUNDS

[75] Inventors: Andreas Lindert, Troy; John R. Pierce, Huntington Woods; David R. McCormick, Madison Heights, all of Mich.

[73] Assignee: Henkel Corporation, Ambler, Pa.

[21] Appl. No.: 128,756

[22] Filed: Dec. 4, 1987

[51] Int. Cl.$^5$ .............................................. C08F 16/02
[52] U.S. Cl. ................................. 525/328.8; 525/380
[58] Field of Search .............................. 526/312, 342; 525/328.8, 380

[56] References Cited

U.S. PATENT DOCUMENTS

| | | |
|---|---|---|
| 4,376,000 | 3/1983 | Lindert . |
| 4,424,272 | 1/1984 | Taylor . |
| 4,433,015 | 2/1984 | Lindert . |
| 4,457,790 | 7/1984 | Lindert et al. . |
| 4,517,028 | 5/1985 | Lindert . |
| 4,544,727 | 10/1985 | Ema et al. . |

FOREIGN PATENT DOCUMENTS

| | | |
|---|---|---|
| 2713476 | 9/1978 | Fed. Rep. of Germany . |
| 38-10047 | 6/1963 | Japan . |
| 138610 | 6/1986 | Japan . |
| 902628 | 8/1962 | United Kingdom . |
| 972897 | 10/1964 | United Kingdom . |

OTHER PUBLICATIONS

Metal Finishing Guidebook and Directory, pp. 590–603 (1972).
U.S. Ser. No. 128,672, filed Dec. 4, 1987, entitled "Treatment and After-Treatment of Metal with Polyphenol Compounds".
U.S. Ser. No. 128,673, filed Dec. 4, 1987, entitled "Treatment and After-Treatment of Metal with Carbohydrate Modified Polyphenol Compounds".
Metal Handbook, vol. II, 8th Edition, pp. 529–547, American Society for Metals.

*Primary Examiner*—Joseph L. Schofer
*Assistant Examiner*—N. Sarofim
*Attorney, Agent, or Firm*—Ernest G. Szoke; Wayne C. Jaeschke; Michael P. Brennan

[57] ABSTRACT

A metal treatment solution comprising an effective amount of a soluble or dispersible compound which is a derivative of a polyphenol. The present invention comprises novel derivatives of polyphenol compounds useful in the treatment of the surface of metal articles. The present invention also encompasses novel surface treatment solutions or dispersions, and methods of using these solutions or dispersions. The compositions of the present invention include amine oxide containing polyphenol compounds and derivative thereof. The molecular weight of the polyphenols used in derivatives of the present invention have molecular weights of from about 360 to about 30,000 or greater. The resulting derivatives of the present invention typically have a molecular weight of up to about 2,000,000 with molecular weights within the range of about 700 to about 70,000 being preferred.

15 Claims, No Drawings

TREATMENT AND AFTER-TREATMENT OF METAL WITH AMINE OXIDE-CONTAINING POLYPHENOL COMPOUNDS

BACKGROUND AND SUMMARY OF INVENTION

The present invention relates to the field of protective and/or decorative surface treatment of articles, particularly metals, plastics, and the like.

The present invention comprises novel derivatives of polyphenol compounds useful in the treatment of the surface of metal articles. The present invention also encompasses novel surface treatment solutions or dispersions, and methods of using these solutions or dispersions.

In accordance with the present invention, novel compositions, solutions and dispersions, and methods are provided for use in providing a protective or decorative metal surface treatment; these include the treatment of previously untreated bare metal surfaces, the post-treatment of phosphatized or conversion coated metal surfaces, the application of a paint or other decorative coating or film, and the like. The present invention additionally includes compositions and methods that are particularly useful for treating various metal surfaces including aluminum, steel and zinc metal surfaces. The compositions, solutions and dispersions, and methods of the present invention provide a coating on the metal surface which is effective in enhancing the corrosion resistance and paint adhesion characteristics of the metal surface whether previously conversion coated or not. A further and more detailed understanding of this invention can be obtained from the following disclosure. All parts and percentages are by weight unless otherwise indicated.

The need for applying protective coatings to metal surfaces for improved corrosion resistance and paint adhesion characteristics is well known in the metal finishing art as well as in other metal arts. Traditionally, metal surfaces are treated with chemicals which form a metal phosphate and/or metal oxide conversion coating on the metal surface to improve the corrosion resistance and paint adhesion thereof. The conversion coated metal surfaces are also generally rinsed or post-treated with a solution containing a hexavalent chromium compound for even greater corrosion resistance and paint adhesion.

Because of the toxic nature of hexavalent chromium, expensive wastewater treatment equipment must be employed to remove the residual chromates from plant effluent to comply with environmental regulations and to improve the quality of rivers, streams, and drinking water sources. Hence, although the corrosion resistance and paint adhesion characteristics of conversion coated metal surfaces can be enhanced by an after-treatment solution containing hexavalent chromium, these disadvantages in recent years have lead to much research and development in an effort to uncover effective alternatives to the use of post-treatment solutions containing hexavalent chromium. One alternative to the use of hexavalent chromium involves the use of derivatives of polyphenol compounds such as poly-vinyl phenol. Suitable derivatives and suitable treatment solutions are disclosed in the earlier U.S. Pat. Nos. 4,517,028, May 14, 1985 to Lindert; 4,376,000, Mar. 8, 1983 to Lindert; and 4,433,015, Feb. 21, 1984 to Lindert; 4,457,790, July 3, 1984 to Lindert, et al.; all of which are expressly incorporated herein by reference. Also see the two commonly assigned applications filed the same date herewith entitled "Treatment And After-Treatment Of Metal With Polyphenol Compounds", U.S. Ser. No. 128,672; and "Treatment And After-Treatment Of Metal With Carbohydrate-Modified Polyphenol Compounds", U.S. Ser. No. 128,673; both of which are expressly incorporated herein by reference.

DETAILED DESCRIPTION OF THE INVENTION

In a typical protective metal surface treatment operation employing this invention, the metal to be treated is initially cleaned by a chemical or physical process and then water rinsed to remove grease and dirt from the surface. The metal surface is then brought into contact with the treatment solution of this invention. Alternatively, and preferably, instead of contacting the metal surface with the treatment solution of this invention immediately following the cleaning process, a conversion coating solution is applied to or otherwise used to pre-treat the metal surface in a conventional manner to form a conversion coating thereon. Then the conversion coated surface is water rinsed and the metal surface is brought into contact with the treatment solutions of the present invention.

Although solutions and/or dispersions of the invention can be effectively applied to treated or untreated metal surfaces, speaking generally the present invention is particularly useful if the metal surface has previously been conversion coated and the invention is accordingly used as a post-treatment; accordingly, as used herein, the term "post-treatment" means the treatment of a metal surface which is not bare metal, and preferably has been previously treated with a conventional conversion coating process. Such conversion coatings are well known and have been described, for example, in *Metal Handbook*, Volume II, 8th Edition, pp. 529–547 of the American Society for Metals and in *Metal Finishing Guidebook and Directory*, pp. 590–603 (1972), the contents of both of which are specifically incorporated by reference herein.

The compositions and processes of the present invention are useful in treating a broad range of metal surfaces, including metals having surfaces that have been conversion coated with suitable conversion coatings such as iron phosphate, manganese phosphate, zinc phosphate, zinc phosphate modified with calcium, nickel, or manganese ions. Examples of suitable metal surfaces include zinc, iron, aluminum and cold-rolled, polished, pickled, and hot-rolled steel and galvanized steel surfaces. As used herein, the term "metal surface" includes both untreated metal surfaces and conversion coated metal surfaces.

The polyphenol compounds of the present inventions are Polymer Materials 1 and 2, their salts, and mixtures thereof. The treatment compositions of the present invention comprise an effective amount of a soluble or dispersible treatment compound (Polymer Material) in a carrier that is suitable for surface treatment, i.e., one that allows the selected Polymer Material to be deposited or otherwise placed on the surface of a metal. The soluble or dispersible compound employed in the present invention is selected from the group consisting of any one of the following Polymer Materials 1 or 2 (characterized below), solutions or dispersions of these Polymer Materials, their salts, and mixtures thereof. Salts include the acid and alkaline salts thereof.

The methods of the present invention comprise contacting a metal surface with treatment compositions described herein.

Polymer Materials 1 and 2 are as follows.

POLYMER MATERIAL 1

Polymer Material 1 comprises a homo- or co-polymer compound or material having at least one unit having the formula:

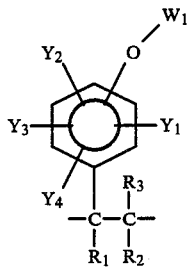

$R_1$ through $R_3$ are independently selected for each repeating unit from hydrogen, an alkyl group having from 1 to about 5 carbon atoms or an aryl group having from about 6 to about 18 carbon atoms;

$Y_1$ through $Y_4$ are independently selected for each repeating unit from hydrogen, Z, $-CR_4R_5OR_6$, $-CH_2Cl$, or an alkyl or aryl group having from 1 to 18 carbon atoms; provided at least a fraction of one of the $Y_1$ through $Y_4$ units is Z. Z is

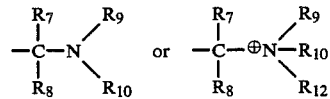

$R_4$ through $R_{12}$ are independently selected for each repeating unit from hydrogen, an alkyl, aryl, hydroxyalkyl amino-alky, mercapto-alkyl or phospho-alkyl moety, or $-O^{(-1)}$ or $-OH$; provided at least a fraction of Z is or forms an amine oxide or hydroxyl amine. Preferably, $R_1$ or $R_4$ through $R_{12}$ are carbon chain lengths up to a length at which the compound is no longer soluble or dispersible in a suitable surface treatment carrier, such as water.

$W_1$ is independently selected for each repeating unit from the group consisting of hydrogen; acyl; acetyl; benzoyl; 3-allyloxy-2-hydroxy-propyl-; 3-benzyloxy-2-hydroxy-propyl-; 3-alkylbenzyloxy-2-hydroxy-propyl-; 3-phenoxy-2-hydroxy-propyl-; 3-alkylphenoxy-2-hydroxy-propyl-; 3-butoxy-2-hydroxy-propyl; 3-alkyloxy-2-hydroxy-propyl; 2-hydroxyoctyl-; 2-hydroxy-alkyl-; 2-hydroxy-2-phenyl ethyl-; 2-hydroxy-2-alkyl phenyl ethyl- isopropenyl- propenyl-; benzyl-; methyl-; ethyl-; propyl-; alkyl; allyl; alkyl benzyl-; haloalkyl-; haloalkenyl; 2-chloro-propenyl-; sodium, potassium; tetra aryl ammonium; tetra alkyl ammonium; tetra alkyl phosphonium; tetra aryl phosphonium; or a condensation product of ethylene oxide, propylene oxide, or a mixture or copolymer thereof.

Particularly preferred are final materials wherein at least a fraction of the $W_1$ include "Z" and/or the final material is based upon a vinyl moiety, α methyl vinyl phenolic moiety, and mixtures thereof. For example, vinyl phenol, isopropenyl phenol and derivatives thereof may be used.

It will be appreciated that the depiction above represents a repeating unit that characterizes the compound or materials of the present invention; no terminating end units are depicted. The end group not depicted of the polymers of the present invention can be selected by the skilled artisan relying upon art-disclosed techniques. For example, the end groups of the polymer may either be those resulting from the specific polymerization process employed or those intentionally added to alter the polymer characteristics. For example, the end groups may be hydrogen, hydroxyl, initiation fragments, chain transfer agents, disproportionation groups, or other similar methods of terminating a growing polymer chain.

It is appreciated by those skilled in the art that the alkenylphenolic moieties of the present invention can be either randomly distributed within the co-polymer and terpolymer or can be synthisized to constitute a block orientated polymer, depending upon the methods and conditions used for polymerization.

Polymer Material 2 —Condensate Polymers

By the term "condensation polymers" is meant the following:

A condensation polymer is a material wherein condensable modified forms (modified to be condensable as noted below) of Polymer Material 1 is condensed with a second compound selected from the group consisting of phenols (preferably phenol, alkylphenol, arylphenol, cresol, resorcinol catechol, pyrogallol) tannins (both hydrolyzable or condensed), novolak resins, lignin compounds, or mixtures thereof and an aldehyde, ketone, or mixture thereof, to produce a condensation resin prepolymer product that is a prepolymer of Polymer Material 2. The modified starting materials are modified by initially failing to include the "Z" moiety prior to initiating condensation; an additional modification to make the starting materials condensable will also be appreciated as necessary in that $Y_1$ through $Y_4$ cannot be Z, $-CR_{11}R_5OR_6$, or $-CR_4R_5OR_6$. The "Z" moiety (as described above) is then added later to these condensation prepolymers by again reacting the condensation prepolymer resin with (1) an aldehyde, ketone, or mixtures thereof, and (2) a secondary amine to produce an adduct which can react with acid and/or can be reacted with hydrogen peroxide to generate an amine oxide and can be used in water or in an organic solvent.

While this condensation product is described for convenience as being prepared by a sequential reaction, it will be appreciated that these materials can be prepared by carrying out the necessary steps in any order, or simultaneously. However, the sequence described is preferred.

The surface treatment solutions of this invention comprise Polymers Material 1, 2, or mixtures thereof, which are preferably dissolved or dispersed in a carrier suitable for depositing or otherwise placing the Polymer Material on the surface of a metal, i.e., as a metal surface treatment, metal surface post treatment, a paint, protective film, or as a component of any of the foregoing.

These Polymer Materials of the present invention may be made soluble or dispersible in water or organic solvent-type carriers. They may therefore be employed as a treatment solution when dissolved in water or in an organic solvent such as, for example, ethanol. Preferably, however, the Polymer Material selected is used in aqueous solution as a carrier.

Accordingly, it is highly desirable to provide or improve the water solubility or water dispersibility of the selected Polymer Material. In addition to the use of the amine oxide fraction, this is preferably done with an acid used for neutralization and/or complexation of a "Z" moiety thereof (if in need thereof). Such acids may be organic or inorganic. Useful and preferred acids for this purpose include carbonic acid, acetic acid, citric acid, oxalic acid, ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; these may be employed alone or in combination with each other and may be neutralized by conventional acid-base reactions or by complexing.

In a highly preferred embodiment, the addition of water to the neutralized, overneutralized or partially neutralized treatment compounds mentioned above results in a water soluble or dispersible solution or emulsion of the polymer useful for metal treatment.

Alternately, the final Polymer Material compounds of the present invention can be made water soluble or dispersible by neutralization of the phenolic group with an organic or inorganic base. Suitable bases for this purpose include tetra-alkylammonium hydroxides such as tetra- butylammonium hydroxide, tetra arylammonium hydroxide, sodium hydroxide, potassium hydroxide and the like.

In a highly preferred embodiment, the final Polymer Material can be prepared such that a sufficient amount or fraction of the "Z" moiety is an amine oxide and accordingly does not require neutralization.

Within such materials, the ratio of any single monomer to any other monomer can be about 1:99 to about 99:1, preferably about about 5:1 to about 1:5, and more preferably 1.5:1 to about 1:1.5.

The molecular weight of the polyphenols used in the preparation of derivatives claimed in the present invention can be a dimer, but may preferably be low molecular weight oligomers or resinous polymers having molecular weights in the range of about 360 to about 30,000 or greater. The upper limit of molecular weight of materials useful in surface treatment compositions is generally determined by the functional limitation that the derivative therefrom must be soluble or dispersible in the selected carrier. The resulting derivatives of the formulae set forth hereinabove will typically have a molecular weight of up to about 2,000,000 with molecular weights within the range of about 700 to about 70,000 being preferred.

Typically, the pH of the aqueous solution will vary from about 0.5 to about 14. Generally the aqueous solution will have a pH of from about 2.0 to about 12 both for the stability of the solution and for best results on the treated metal surfaces.

It is contemplated that the compositions and treatment solutions of the present invention can be used to treat the surface of a variety of materials, particularly metal and plastic or "plastic-like" surfaces. Preferred metal surfaces include iron-, zinc- and aluminum-based metals. Preferred "plastic-like" material surfaces include resin or polymeric materials, including thermoplastic and thermosetting materials, as well as natural rubbers, mixtures of these materials, and the like.

The coating applied may be for protection or decorative in nature, or may be a preparation of the surface for another treatment; it may also serve several functions at once.

The thickness of the final dry or cured coating will depend on its purposes or functions, and may typically range from about 0.0001 mil to about 25 mils or greater. The typical and preferred metal surface treatment (such as a conversion-type protective/paint base coating) is in the range of about 0.05 mil and below, and more preferably about 0.0001 mil to about 0.05 mil. When acting as a paint or decorative and protective surface treatment, the resulting coating thickness is about 0.05 mil and above, preferably about 0.05 to about 25 mils, and more preferably about 0.05 to about 10 mil.

It is further contemplated that the treatment compounds of the present invention will generally be used in surface treatment compositions over a wide range of concentrations. It will be appreciated that the levels of use or useful ranges will vary with many factors well-known to the skilled artisan. Useful levels of the compositions of the present invention dissolved or dispersed in a carrier may be in the range of about 0.001% to about 80 percent, depending upon the ultimate use. For example, when used as a pre- or post-treatment of a metal surface, useful levels typically include a dilute to moderate concentration of from about 0.001% to about 20%, by weight, preferably about 0.001% to about 10 percent, by weight, and still more preferably about 0.001% to about 5% by weight. Practically speaking, a concentration of 0.0025 to 1% is preferred in metal surface treatment (compositions especially for iron-, zinc-, or aluminum-based metal surfaces). However, under some circumstances (for example when transporting or storing the solution or when using it in a "dry-in-place" system), a concentrate of the solution may be preferred. Higher levels (for example, as high as 80% by weight) may also be employed when the treatment composition is part of a paint system.

Of course, the treatment solutions of the present invention can also comprise ingredients typically found in other similar treatment compositions (e.g., conversion coating compositions) in addition to the polymer compound. For example, the treatment solution may optionally comprise an effective amount of a treatment compound according to the present invention, and from about 0.001% to about 3.0% of a metal ion. Metal ions useful for metal treatment in combination with polyphenols of this invention include first row transition metals generally, Group IV-B-metals generally, iron, nickel, cobalt, vanadium, chromium, titanium, zirconium hafnium, scandium, yttrium, lanthanum and their respective Lanthanoid and Actinoid metals, as well as molybdenum and tungsten. In addition, tin, silicon, and aluminum compounds, and in particular their oxides, in combination with the materials of the present invention can be used to improve both the effectiveness or performance of the treatment solution in use. Such materials may also reduce the time of application of treatment solution to the metal surface to as short a time as about 2 to 5 seconds as might be required on a coil coating line. Complex fluoride materials may also be employed. For example suitable complex fluoride materials include $BF_4^{(-1)}$, $NH_4HF_2$, hexafluoride and the like.

It must be appreciated that the addition of metal ions may result in the formation of polymer-metal ion chelating compounds.

The Polymer Materials of the present invention may also be employed in surface treatment compositions and surface treatment methods other than those described above. For example, the Polymer Material of the present invention may be employed as a component of a dry-in-place system, a paint system, or as an additive in a system needing a crosslinking agent.

For example, the Polymer Materials of the present invention may be used in a film forming composition that includes a pigment, i.e. may be used as a paint. They may also be employed as an additional component in conjunction with other polymeric materials in a paint system. The Polymer Materials of the present invention are particularly useful in cathodic electrocoat surface treatment compositions. Such protective, functional and/or decorative surface treatment solutions preferably employ typical electrocoat/electrodeposition additives at their art-established levels. The polymer materials of the present invention may be employed as a solubilizing polymer and/or binder in an electrocoat paint. They may be so employed alone or in conjunction with other binder resins. For example, such paint compositions may optionally include pigments (both organic and inorganic); film forming resins; binders such as epoxies, oils, alkyds, acrylics, vinyls, urethanes, phenolics, etc.; and solvents including hydrocarbons, chlorinated aliphatics and aromatics, alcohols, ethers, ketones, esters; nitrated materials; and particulate zinc.

Accordingly, the compositions and materials of this invention can be used alone or in conjunction with other resins as polymeric coatings on surfaces. These coatings will crosslink or self-crosslink and can be used in conjunction with other crosslinking agents such as melamine-formaldehyde or urea-formaldehyde resins as well as phenolic resins, epoxy resins, isocyanates and blocked isocyanates. The Mannich adducts can also be used to crosslink with vinyl functionality as is present in resins such as diallylmelamines, butadienes, multifunctional acrylic oligomers, unsaturated fatty acids in alkyd resins, fatty acid modified epoxy resins, and the like.

Application of the treatment compositions of the present invention in the treatment step to a metal or other desired surface can be carried out by any conventional method. While it is contemplated that the metal surface will preferably be a conversion coated metal surface, the treatment step can alternatively be carried out on an otherwise untreated metal surface to improve the corrosion resistance and paint adhesion thereof.

For example, the treatment composition can be applied by spray coating, roller coating, or dipping. The temperature of the solution applied can vary over a wide range, but is preferably from 70° F. to 160° F. After application of the treatment solution to the metal surface, the surface can optionally be rinsed, although good results can be obtained without rinsing after treatment. Rinsing may be preferred for some end uses, for example, in electrocoat paint applications.

Optionally, the treated metal surfaces is dried. Drying can be carried out by, for example, circulating air or oven drying. While room temperature drying can be employed, the use of elevated temperatures is preferred to decrease the amount of drying time required.

After drying (if desired) the treated metal surface is then ready for painting (with or without the Polymer Materials of the present invention) or the like. Suitable standard paint or other coating application techniques such as brush painting, spray painting, electro-static coating, dipping, roller coating, as well as electrocoating, may be employed. As a result of the treatment step of the present invention, the conversion coated surface has improved paint adhesion and corrosion resistance characteristics.

EXAMPLE 1

80 Grams (0.67 moles) of poly-4-vinylphenol resin having an average melecular weight of Mw=5000 is slowly dissolved in 160 mls of Propasol P ( a propoxylated propanol solvent obtained from (Union Carbide Corp., Danbury, Connecticut) in a one (1) liter resin flask, using a high speed mixer. The resin flask is fitted with a blade stirrer, reflux condenser, and a nitrogen purge. The resin solution is then charged with 51 Grams of 2-N-methyl-amino-ethanol and 160 mls of deionized water. Gentle heating to 60° C. is started and then 54.3 Grams of a 37% solution of formaldehyde in water is added over a 45 minute period. The reaction is then heated to 80° C. for 5 hours at which time the formaldehyde level drops below 0.1% indicating that the reaction is complete. The reaction mixture is then allowed to cool until a temperature of 40° C. is reached. Then to the above Mannich adduct of poly-4-vinylphenol is added 950 Grams of deionized water, and 85 Grams (0.75 moles) of a 30% hydrogen peroxide solution and allowed to react overnight while maintaining the temperature at 40° C.

The amine oxide of the Mannich adduct which is formed by this procedure is soluble in water without further neutralization.

What is claimed is:

1. A composition comprising a surface treatment carrier having a homopolymer or copolymer compound dissolved or dispersed therein, wherein said homopolymer or copolymer comprises a material having at least about one-sixth of the units having the formula:

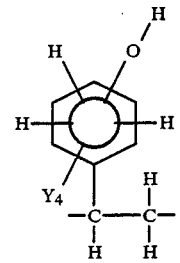

where $Y_4$ is:

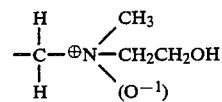

2. A composition according to claim 1 wherein the carrier comprises water.

3. A composition according to claim 1 wherein the carrier is aqueous and the polymer has been neutralized with an acid.

4. A composition according to claim 3 wherein the acid is carbonic acid.

5. A composition according to claim 3 having a pH of from about 0.5 to about 14.

6. A composition according to claim 5 having a pH of from about 2.0 to about 12.

7. A composition according to claim 1 wherein said homo- or co-polymer compound comprises about 0.001 to about 80% by weight of the final composition.

8. A composition according to claim 7 wherein said homo- or co-polymer compound comprises from about 0.001% to about 10% of said composition.

9. A composition according to claim 8 wherein said homo- or co-polymer compound comprises from about 0.001 to about 5% of said composition.

10. A composition according to claim 9 wherein said homo- or co-polymer compound comprises from about 0.025% to about 1% of said composition.

11. A composition according to claim 7 wherein said homo- or co-polymer compound comprises from about 1% to about 80% of said composition.

12. A composition according to claim 5 which additionally comprises a complex fluoride material.

13. A composition according to claim 1 which additionally comprises a dissolved or dispersed compound that includes compounds of titanium, zirconium, hafnium, silicon, or mixtures thereof.

14. A composition according to claim 1 which additionally comprises an oxide of silicon, titanium, tin, aluminum, cobalt, nickel, or mixtures thereof.

15. A composition according to claim 1 which additionally comprises a paint system additive selected from the group consisting of a film forming resin, a pigment, a binder, particulate zinc, or mixtures thereof.

* * * * *